W. WEBBER.
ENDLESS APRON FOR HARVESTERS.
APPLICATION FILED MAR. 6, 1919.
1,429,470.
Patented Sept. 19, 1922.
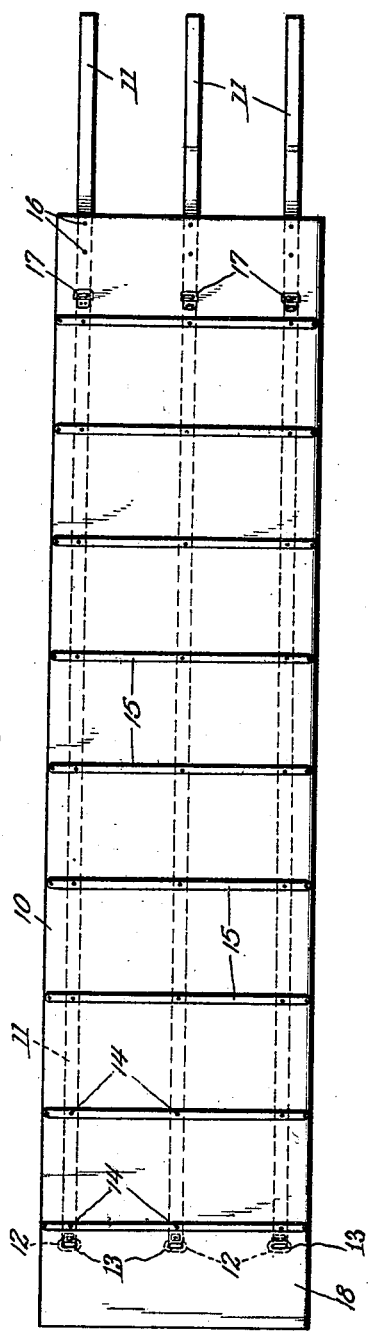
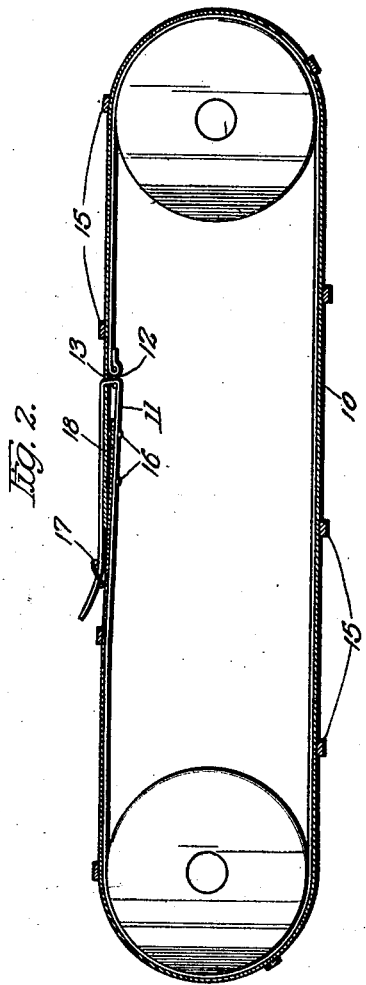
Inventor.
William Webber.
Chas. E. Lord
Atty.

Patented Sept. 19, 1922.

1,429,470

UNITED STATES PATENT OFFICE.

WILLIAM WEBBER, OF LA GRANGE, ILLINOIS, ASSIGNOR TO INTERNATIONAL HARVESTER COMPANY, A CORPORATION OF NEW JERSEY.

ENDLESS APRON FOR HARVESTERS.

Application filed March 6, 1919. Serial No. 281,051.

*To all whom it may concern:*

Be it known that I, WILLIAM WEBBER, a citizen of the United States, residing at La Grange, in the county of Cook and State of Illinois, have invented certain new and useful Improvements in Endless Aprons for Harvesters, of which the following is a full, clear, and exact specification.

This invention relates to endless aprons for harvesters and like machines.

Endless conveyer aprons are used in various locations on harvesting machines to convey the grain or other material as desired, and as these aprons are usually made of canvas and are exposed to the weather, it is necessary to provide for adjustments as to length. This has been done in the past by fastening the aprons by means of straps and buckles, leaving a loose flap at one end to overlap the ends of the straps. The loose flap is very objectionable since by repeated "whipping" as the apron travels around the rollers, the flap is quickly worn out, and also when aprons of this type are used to feed material to operating mechanism such as a threshing cylinder, the flap sometimes comes into contact with such revolving mechanism and is torn to shreds and destroyed. In view of these difficulties it has been necessary to tie the flap securely each time the apron is lengthened or shortened in order to prevent it from wearing.

It will be readily seen that this entails a considerable loss of time and attention, as it is often necessary to tighten the apron several times during a day.

The object of the present invention is to overcome these difficulties by the provision of means for securing the flap in place at the same time that the apron is adjusted and by the same operation.

I have illustrated in the accompanying drawing one embodiment of my invention, and in the drawing,—

Figure 1 shows a plan view of the apron; and

Figure 2 is an enlarged view showing the apron in side elevation in position on the apron rollers.

In the construction illustrated the apron 10 is preferably formed of canvas and is provided with a series of longitudinally extending straps 11 which may be formed of canvas, leather, or any other suitable material. The straps are provided at one end with rings 12 secured in any suitable manner to the strap ends and positioned below registering apertures 13 formed in the apron and spaced from one end of the apron. The portion of the apron beyond the apertures is termed the "flap". The straps may be secured to the apron in any suitable manner, and in the illustration given they are secured by means of a series of rivets 14 which also secure cross slats 15 to the apron. The straps at the ends opposite those provided with the rings 12 are secured to the opposite end of the apron by means of rivets 16, and are extended for a suitable distance beyond the end of the apron. Buckles 17 of any desired construction are secured to the apron opposite the end having the apertures 13, the securing means for the buckles preferably passing also through the straps.

The method of placing the apron on the apron rollers will be clear from an inspection of Fig. 2, which illustrates in side elevation one of the straps 11 as passing through ring 12 and aperture 13, and also passing through one of the buckles 17. From the showing in Fig. 2 it will be seen that the flap 18 (as the portion of the apron beyond the rings 12 is termed) is positioned between the upper portion of the straps 11 and the opposite end of the apron being securely held by means of the straps. If occasion requires, the apron may be lengthened or shortened by loosening or tightening the straps, but the flap is at all times held between the upper portions of the straps and the apron, and is thereby prevented from whipping or coming in contact with any moving parts of the machine.

It should be noted that no additional operation is necessary to secure the strap as the apron is adjusted, but that a single operation secures the flap and adjusts the apron.

While I have in the above specification illustrated and described a specific embodiment of my invention, it should be distinctly understood that I do not intend to limit myself to the particular construction illustrated, but that modifications may be employed without departing from the spirit and scope of the invention as expressed by the following claims:

1. An apron provided with a flap at one end thereof and having oppositely arranged attaching means adjacent the ends for forming an endless apron and straps forming a part of said attaching means secured to one end for entirely embracing both ends of the apron.

2. In an apron, a flap, fastening means adjacent the ends of said apron, and means cooperating with and forming a part of said fastening means for securing and embracing the ends of the apron together and securing said flap against movement.

3. In an apron having a series of apertures spaced from one end thereof, straps longitudinally alined with said apertures and extending outwardly from the opposite end of the apron, buckles secured to said apron adjacent said last named end whereby said straps may be passed through said apertures and over a portion of said apron to said buckles.

4. An apron having a series of longitudinal straps secured thereto and extending outwardly from one end thereof, rings secured to said straps at one end and spaced from one end of said apron, said apron having apertures registering with said rings and fastening means carried by said apron adjacent the end of said apron opposite said rings.

5. In an apron, straps secured at one end thereof and extending outwardly therefrom, buckles secured to said apron adjacent the end carrying said straps, said apron having apertures longitudinally alined with said buckles and straps and spaced from the opposite end of said apron.

6. In an apron, a flap, straps secured to said apron, adjacent said flap and extending longitudinally thereof, rings secured to said straps at the ends adjacent said flap, said flap being provided with a series of apertures registering with said rings, and buckles carried by said apron disposed in longitudinal alinement with said rings and straps and located adjacent the opposite end of said apron.

In testimony whereof I affix my signature.

WILLIAM WEBBER.